US007715552B2

(12) United States Patent
Pinder et al.

(10) Patent No.: US 7,715,552 B2
(45) Date of Patent: May 11, 2010

(54) DATA AUTHENTICATION WITH A SECURE ENVIRONMENT

(75) Inventors: Howard G. Pinder, Norcross, GA (US); David A. Sedacca, Atlanta, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 976 days.

(21) Appl. No.: 11/428,746

(22) Filed: Jul. 5, 2006

(65) Prior Publication Data

US 2008/0010469 A1  Jan. 10, 2008

(51) Int. Cl.
*H04K 1/00* (2006.01)
*H04N 7/167* (2006.01)
*H04L 9/08* (2006.01)
(52) U.S. Cl. .................. 380/28; 380/230; 380/239; 380/280
(58) Field of Classification Search .................. 380/28, 380/230, 239, 280
See application file for complete search history.

(56) References Cited

U.S. PATENT DOCUMENTS

| 5,734,720 | A   | * | 3/1998 | Salganicoff .................. 380/211 |
| 6,105,134 | A   | * | 8/2000 | Pinder et al. ................. 713/170 |
| 2001/0001014 | A1 | * | 5/2001 | Akins et al. .................. 380/241 |
| 2002/0067376 | A1 | * | 6/2002 | Martin et al. ................. 345/810 |
| 2003/0074565 | A1 | * | 4/2003 | Wasilewski et al. ......... 713/182 |
| 2004/0177369 | A1 | * | 9/2004 | Akins, III ..................... 725/31 |

* cited by examiner

*Primary Examiner*—Nasser Moazzami
*Assistant Examiner*—Mohammad W Reza
(74) *Attorney, Agent, or Firm*—Merchant & Gould

(57) ABSTRACT

Included are systems and methods for data authentication. At least one embodiment of a system includes a secure processor configured as a physically secure environment, the secure processor further configured to receive a control word from a headend, the secure processor further configured to encrypt the received control word using a first encryption key. Other embodiments of a system includes a transport processor configured to receive the encrypted control word, the transport processor further configured to decrypt the received control word using a first decryption key, wherein the first decryption key is compatible with the first encryption key.

15 Claims, 10 Drawing Sheets

DATA AUTHENTICATION WITH A SECURE ENVIRONMENT

TECHNICAL FIELD

This disclosure relates generally to data authentication, and more particularly to data encryption and authentication with a secure environment.

BACKGROUND

In the design of Set Top Terminals (STTs), such as cable boxes, satellite boxes, cable-ready televisions, satellite-ready televisions, etc., designers are often faced with challenges related to preventing users from receiving programming that they have not purchased. More specifically, in many circumstances, users can purchase one or more programming packages that can provide one or more programming channels. Depending on the cost of the programming package, more or fewer channels and/or options may be provided. As many users desire more programming channels and/or options without subjecting themselves to the cost of additional channels and/or options, many of these users have become sophisticated in understanding the inner-workings of an STT. With this understanding, many of these users attempt to manipulate the STT to provide programming channels and/or options that the user has not purchased.

Thus, a heretofore unaddressed need exists in the industry to address the aforementioned deficiencies and inadequacies.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
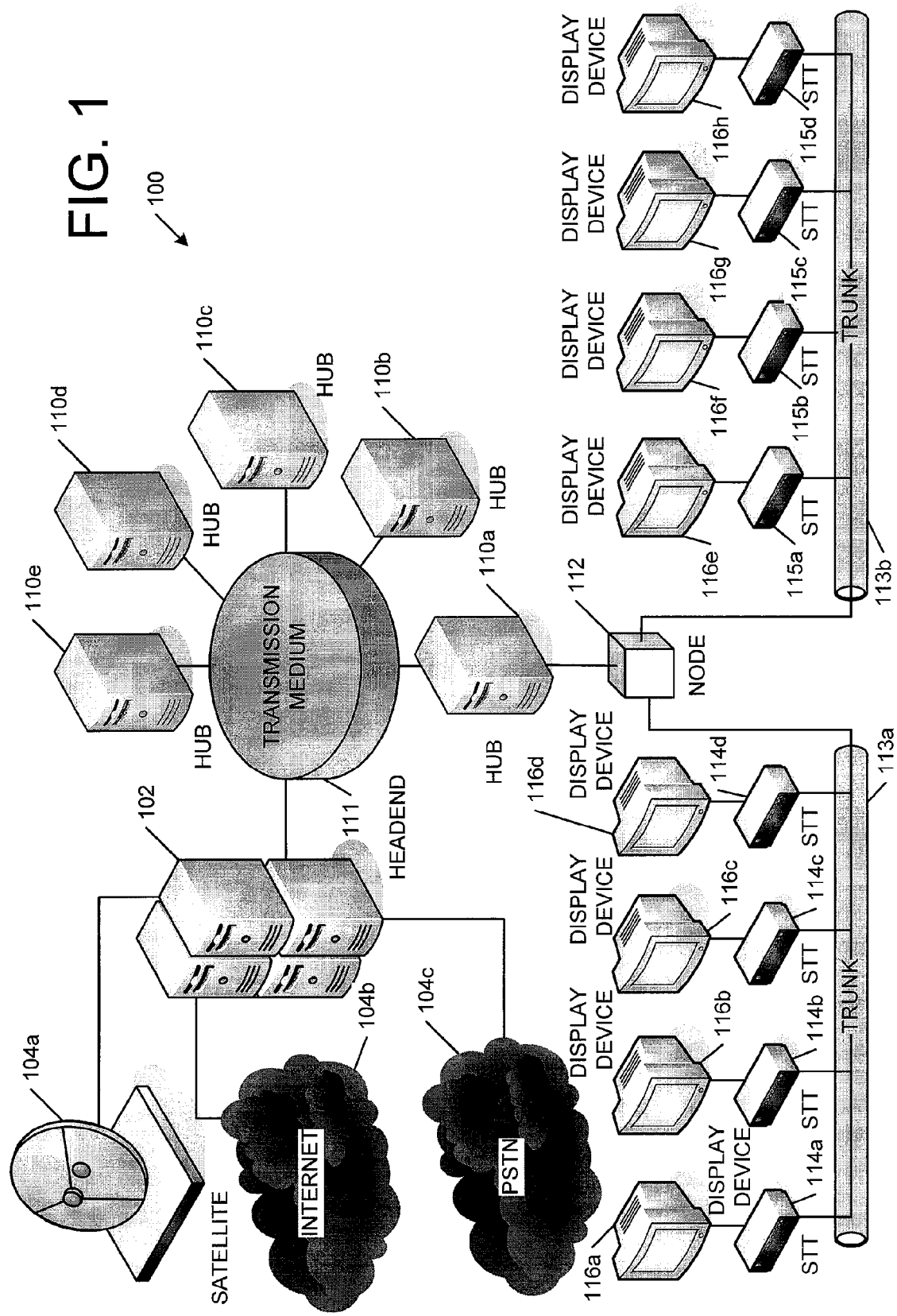
FIG. 1 is a network diagram illustrating a plurality of STTs in operation.

FIG. 1 is a network diagram illustrating a plurality of STTs in operation. More specifically, the components illustrated in FIG. 1 can generally be implemented as part of a media network 100, which may include a cable television system (media network), Digital Subscriber Line (DSL) network, Internet Protocol (IP) network, fiber-to-home network, and/or other network type. FIG. 1 shows a view of a media network 100, which can take the form of a network system that can deliver video, audio, voice, and data services to set top users. Although FIG. 1 depicts a high level view of a media network 100, one can appreciate that any of a plurality of different cable, satellite, and other systems can tie together a plurality of components and/or networks into an integrated global network so that STT users can receive content provided from anywhere in the world.

The media network 100 can be configured to provide programming signals as digitally formatted signals in addition to delivering analog programming signals. Further, media network 100 can also be configured to support one-way broadcast services as well as both one-way data services and two-way media and data services. The two-way operation of the media network 100 can allow for user interactivity with services, such as Pay-Per-View programming, Near Video-On-Demand (NVOD) programming according to any of several NVOD implementation methods, View-On-Demand (VOD) programming (according to any of several known VOD implementation methods), and interactive applications, such as Internet connections and Interactive Media Guide (IMG) applications, among others.

The media network 100 may also be configured to provide interfaces, network control, transport control, session control, and servers to access content and services, and may be configured to distribute content and services to STT users from headend 102 via satellite 104a, PSTN 104b, and/or Internet 104c. As shown in FIG. 1, at least one embodiment of media network 100 includes a headend 102 and a plurality of hubs 110a-110e coupled to a transmission medium 111. The transmission medium 111 can include any configuration of networking logic for providing communication capabilities between components in the media network 100. Additionally included in the nonlimiting example of FIG. 1 is anode 112 coupled to hub 110a. Coupled to the node 112 are trunks 113a and 113b. Trunks 113 can facilitate the communication of programming data to the plurality of digital set top terminals (STTs) 114a-114d and a plurality of analog STTs 115a-115d. Display of the received data can be provided by display devices 116a-116h.

One can appreciate that, although a single headend 102 is illustrated in FIG. 1, a media network 100 can include any number of headends 102. Similarly, other components may be added to the media network 100 and/or removed from media network 100, depending on the desired functionality.

Figure 2:
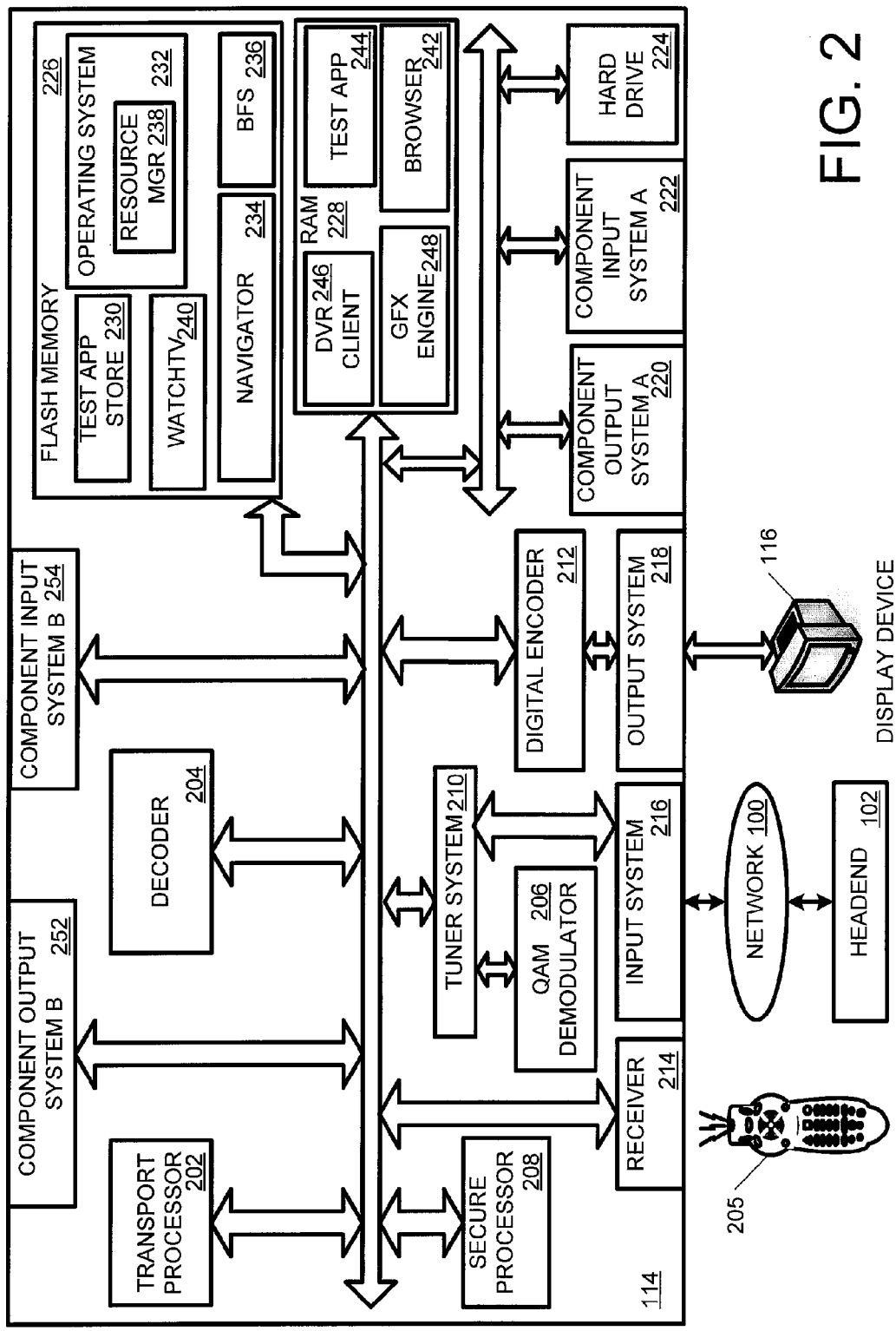
FIG. 2 is a block diagram illustrating an embodiment of components of a digital STT, similar to an STT from FIG. 1.

FIG. 2 is a block diagram illustrating exemplary components of a digital STT, similar to an STT from FIG. 1. More specifically, STT 114 includes an output system 218, which may be coupled to a display device 116, such as a television, computer monitor, etc. The output system 218 may be configured to receive data from a digital encoder 212. STT 114 additionally includes an input system 216, which can be configured to communicate with media network 100 and the headend 102. As discussed in more detail below, the input system 216 and the output system 218 may include one or more components such as an input port and an output port, respectively. Also included is a receiver 214 for receiving user commands via a remote control 205.

The STT 114 may also include a first component output system 220, a first component input system 222, a second component output system 252, and a second component input system 254. These input and output systems can be configured to facilitate communication of data between the STT 114 and other devices.

The STT 114 may also include a data storage infrastructure, such as Random Access Memory (RAM) 228 (which may include Dynamic RAM (DRAM), Video RAM (VRAM), Static RAM (SRAM), and/or other components) and flash memory 226. RAM 228 may include one or more software programs including a Digital Video Recorder (DVR) client 246 for receiving and storing received programming data, a graphics engine 248, a test application 244 and a browser 242. Similarly, flash memory 226 can include test application store 230, a watchTV component 240, and an operating system 232, which may include a resource manager component 238. Also included is a hard drive 224.

As one of ordinary skill in the art will realize, while certain components of FIG. 2 are illustrated as being stored in flash memory and other components are illustrated as being stored in RAM, this is a nonlimiting example. Depending on the particular configuration, any of these components may reside in either (or both) flash memory 226, RAM 228, and the hard drive 224. Additionally, other storage devices (volatile and/or nonvolatile storage) may also be included in the STT 114 for storing and providing access to these and other components.

The STT 114 may also include a transport processor 202 for executing instructions from the flash memory 226, RAM 228, and/or hard drive 224. Transport processor 202 can be a processing device configured to receive input and output streams from media network 100, as well as perform encryption and/or decryption of transport streams from media network 100. A decoder 204 may be included for decoding received data, and a Quadrature Amplitude Modulation (QAM) demodulator 206 for demodulating the received data. A secure processor 208, a tuner system 210, and a digital encoder 212 may also be included.

One should note that while various components are illustrated in STT 114, this is a nonlimiting example. As one of ordinary skill in the art will realize, more or fewer components may be included to provide functionality for a particular configuration. Additionally, while the components of STT 114 are arranged in a particular manner, this is also a nonlimiting example, as other configurations are also considered.

Figure 3:
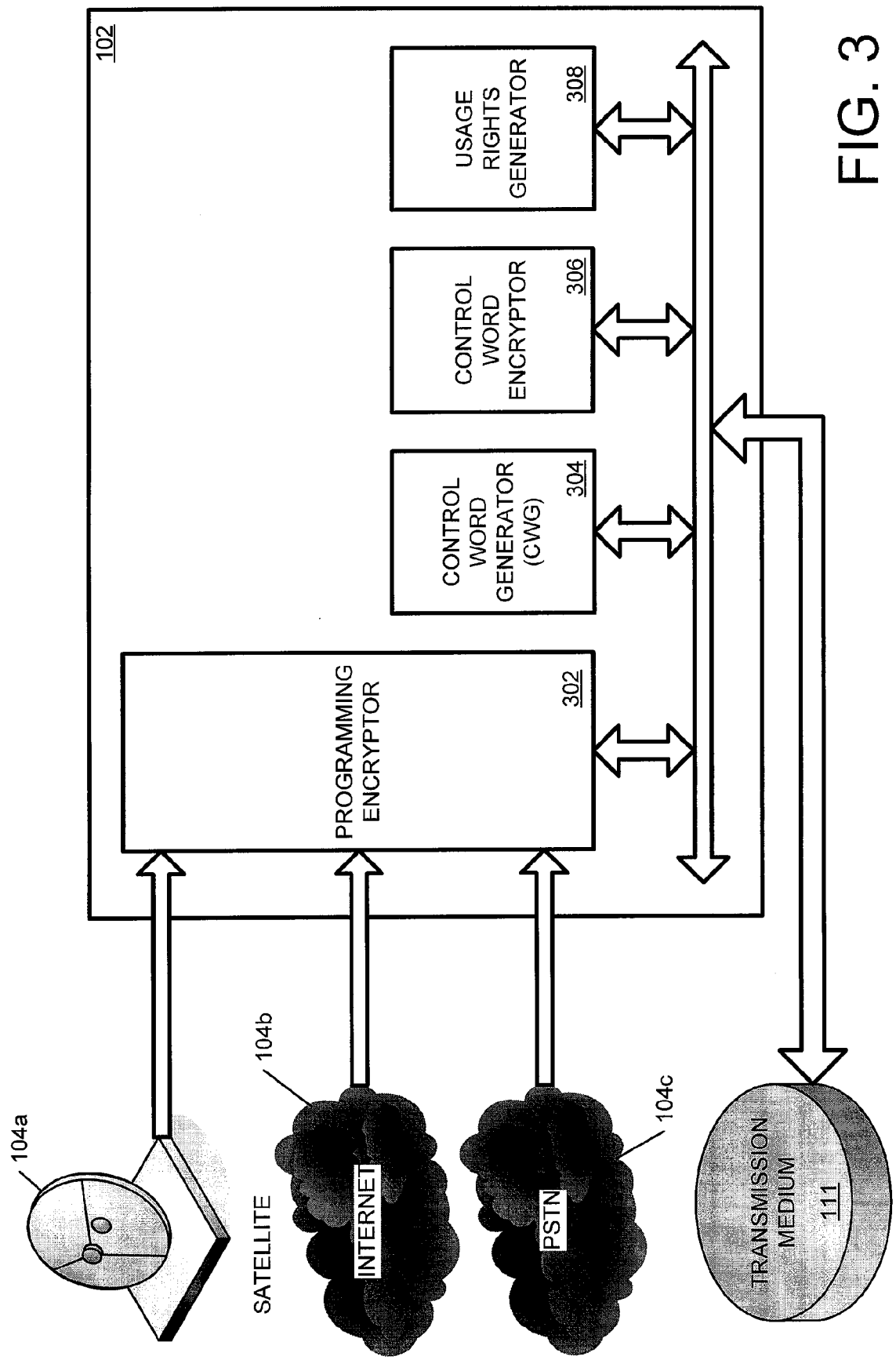
FIG. 3 is a block diagram illustrating an embodiment of components that may be included with a headend, such as the headend from FIG. 1.

FIG. 3 is a block diagram illustrating an embodiment of components that may be included with a headend, such as the headend from FIG. 1. More specifically, as illustrated in FIG. 3, headend 102 can be coupled to a satellite 104a, an external network, such as the Internet 104b, and a PSTN 104c (collectively referred to as "external sources 104"). Headend 102 can be configured to receive programming and other data from external sources 104 at a programming encryptor 302. Programming encryptor 302 can be configured to encrypt the received data from external sources 104 according to a control word, which acts as a key for the encryption. The encryption can follow any number of encoding schemes including, but not limited to Data Encryption Standard (DES), Triple Data Encryption Standard (3DES), Advanced Encryption Standard (AES), and Digital Video Broadcasting Common Scrambling Algorithm (DVB-CSA) and/or other scrambling/encryption techniques.

Upon receiving the desired programming data from external sources 104, the programming encryptor 302 can receive a control word from control word generator 304. The control word generator 304 can generate a control word that can be configured to act as a key for the programming data encryption, thereby serving as a first layer of encryption. The programming encryptor 302 can then send the encrypted programming data over transmission medium 111 for receipt by an STT 114. The control word can then be sent to a control word encryptor 306. The control word encryptor 306 can encrypt the control word as a second layer of encryption. The encrypted control word can then be sent over the transmission medium 111 to an STT 114.

Additionally included with headend 102 is a usage rights generator 308. Associated with much of the programming data received at headend 102 are usage rights. Historically, usage rights included a 2-bit binary string for indicating one of a plurality of states of usage rights. More specifically, as a nonlimiting example, a "00" could refer to a "copy always" usage right. This means a user is permitted to copy a received program as many times as he or she desires. The 2-bit string could also include "01," which could refer to a "copy never" usage right. The "copy never" usage right could indicate that a user is never allowed to copy a particular received program. Another 2-bit string could include "11," which could refer to a "copy once" usage right. A "copy once" usage right could indicate that the user is permitted to make only a single copy of a received program.

While the 2-bit usage rights string has historically been capable of communicating usage rights to an STT, other more complicated usage rights have emerged. More specifically, rights such as the "view time," which can refer to the amount of time a user may keep a copy of a particular program may also be included. Additional rights could also include a "view number," usage right, which could refer to the number of times a user can view a program before the program must be deleted. Other usage rights may also be included.

Referring back to FIG. 3, the usage rights generator 308 can be configured to generate and/or receive a predetermined usage right for one or more of the programs received from external sources 104. Upon generating the usage rights data for a particular program, this data can be sent to transmission medium 111 for communication to an STT 114.

Figure 4:
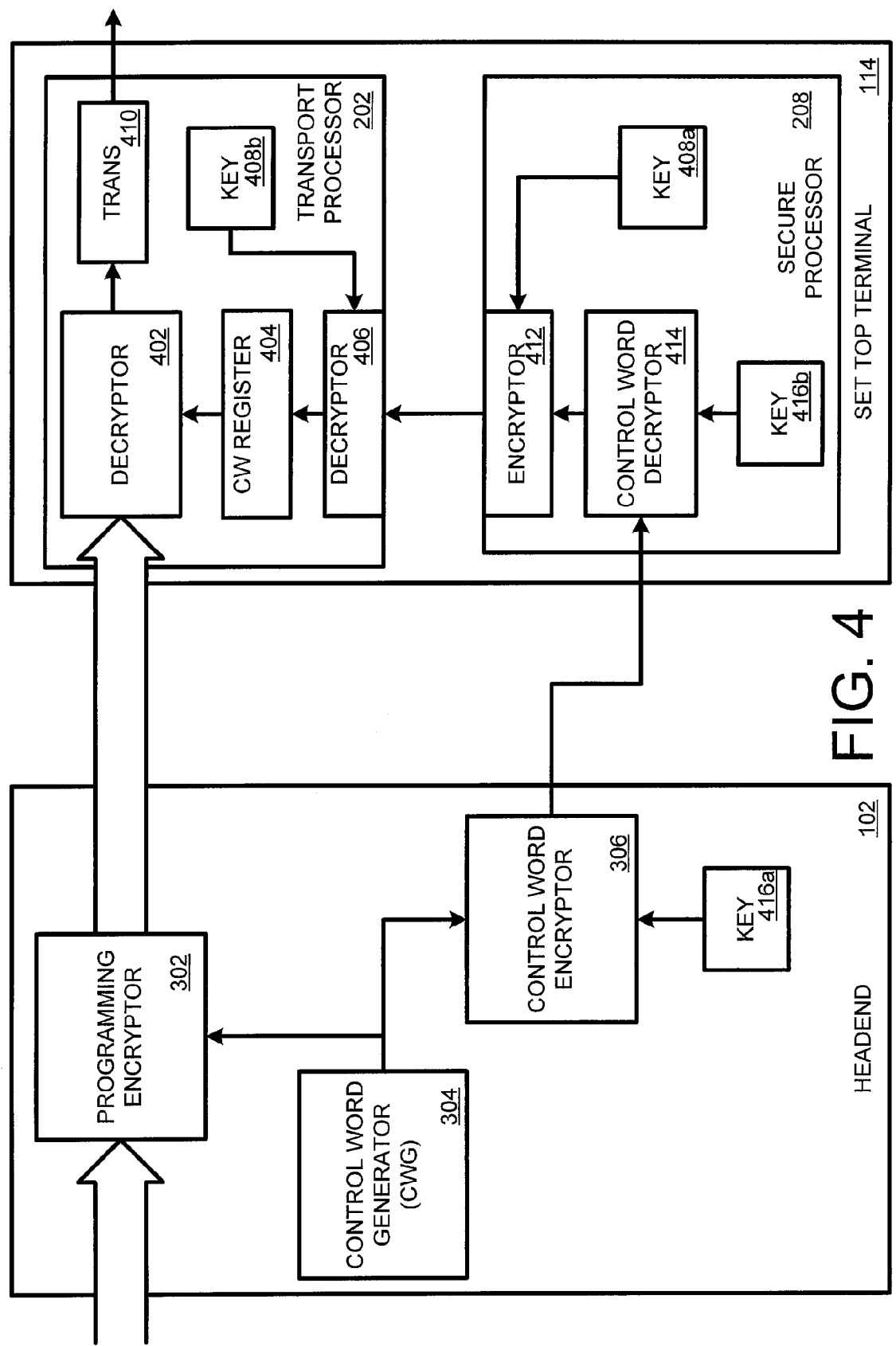
FIG. 4 is a block diagram illustrating an embodiment of some data paths between elements of a headend and elements of an STT, such as the STT from FIG. 2.

FIG. 4 is a block diagram illustrating an embodiment of some data paths between elements of a headend and elements of an STT, such as the STT from FIG. 2. More specifically, as illustrated in this nonlimiting example, programming encryptor 302 receives programming data from external sources 104, as described above. Additionally, programming encryptor 302 receives a control word from control word generator 304. Programming encryptor 302 can be configured to utilize the control word in a first layer of encryption to encrypt the programming data. Programming encryptor 302 can then facilitate transmission of the encrypted programming data to at least one STT 114.

In addition to sending the control word to programming encryptor 302, the control word generator 304 can send the same control word to control word encryptor 306. Control word encryptor 306 can encrypt the received control word by utilizing key 416a. The encrypted control word can then be sent to STT 114 via an Entitlement Control Message (ECM), which may be authenticated and/or encrypted.

The encrypted control word can then be received at STT 114 at a secure processor 208. Secure processor 208 may be configured as a physically secure environment such that, subsequent to manufacture, operations within secure processor 208 are unobservable. More specifically, in at least one embodiment, secure processor 208 can be viewed as a secure environment, where calculations made within the secure environment are not viewed by other components within or outside of STT 114.

Secure processor 208 can be configured to receive the encrypted control word at a control word decryptor 414. Control word decryptor 414 can decrypt the received control word utilizing key 416b. Key 416b can be communicated to secure processor 208 from headend 102, however this is not a requirement. More specifically, in at least one embodiment, both headend 102 and secure processor 208 are configured with logic for generating compatible keys 416, such that when control word decryptor 414 receives the decrypted control word from headend 102, key 416b can be used to decrypt the control word. In such a scenario, because secure processor 208 can be seen as a secure environment (such that operations performed within secure processor 208 are unobservable), the fact that headend 102 and secure processor 208 have knowledge of compatible encryption/decryption keys 416, headend 102 and secure processor 208 possess a shared secret. In at least one embodiment, secure processor 208 can be configured with the same (or compatible) key utilized at encryptor 406 as the key utilized at decryptor 412 in transport processor 202, however this is a nonlimiting example. Similarly, some configurations can be configured with an additional encryption layer such that decryptor 412 and encryptor 406 can exchange a key. The key for this layer may be programmed in the factory.

Upon decrypting the control word, secure processor 208 can encrypt the control word using encryptor 412 via encryption key 408a, as a third layer of encryption. The encrypted control word can be sent to decryptor 406 in transport processor 202. Decryptor 406 can be configured to decrypt the encrypted control word utilizing decryption key 408b. Decryption key 408b can be determined and/or generated by transport processor 202 for compatibility with encryption key 408a. As discussed above, because transport processor 202 and secure processor 208 share the knowledge of compatible encryption/decryption keys 208 and secure processor is considered a secure environment, transport processor 202 and secure processor 208 have a shared secret.

Upon decrypting the control word, decryptor 406 can send the decrypted control word to control word register 404. Control word register 404 can hold the decrypted control word for decryptor 402. Upon receiving the desired programming data from headend 102, decryptor 402 can receive the control word for decrypting the received programming data. Decryptor 402 can then send the decrypted programming data to transmitter 410 for communication to an external device (e.g., display device, computing device, digital VCR, etc.).

Figure 5:
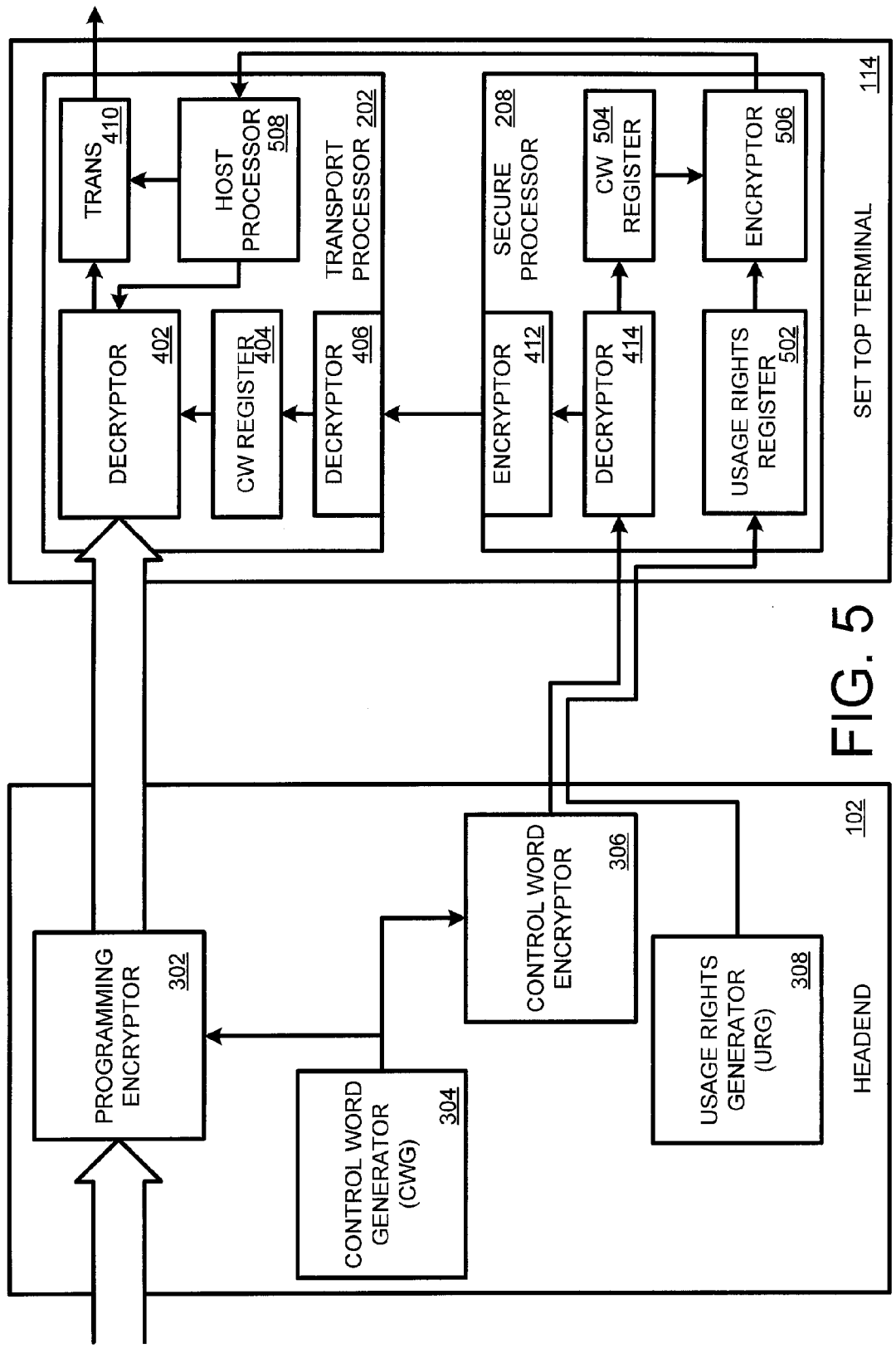
FIG. 5 is a block diagram illustrating an embodiment of some data paths between elements of a headend and elements of an STT with utilization of a host microprocessor, similar to the diagram from FIG. 4.

FIG. 5 is a block diagram illustrating an embodiment of some data paths between elements of a headend and elements of an STT with utilization of a host microprocessor, similar to the diagram from FIG. 4. More specifically, in this nonlimiting example, programming encryptor 302 receives programming data from external sources, as described above. Control word generator 304 sends a control word to programming encryptor 302. Programming encryptor 302 encrypts the received programming data according to the control word. Additionally, control word generator 304 sends the control word to control word encryptor 306. Once encrypted, headend 102 facilitates transmission of the programming data to one or more STTs 114.

Once the control word is encrypted (using a first encryption key, not shown), the encrypted control word can be sent to secure processor 208. Additionally, usage rights generator 308 can be configured to receive and/or generate a usage rights signal. The usage rights signal may then be sent to the secure processor 208 in an Entitlement Control Message (ECM). The ECM may be an authenticated and/or encrypted signal, which may be sent to one or more STT 114.

Upon receiving the encrypted control word, control word decryptor 414 can decrypt the control word using a decryption key (not shown) that is compatible with the encryption key used to encrypt the control word. The decryption can be a result of a shared secret, as described above. Once the control word is decrypted, the control word can be sent to encryptor 412, as discussed above. Encryptor 412 can then encrypt the control word and send the encrypted control word to decryptor 406 in transport processor 202.

In addition to sending the decrypted control word to encryptor 412, decryptor 414 can send the decrypted control word to control word register 504. Similarly, the usage rights signal can be received from headend 102 by usage rights register 502. Encryptor 506 can then receive the usage rights data from usage rights register 502. Encryptor 506 can then encrypt usage rights register with the control word from control word register 504. Encryptor 506 can then send the encrypted usage rights data to host processor 508 in transport processor 202.

Upon receiving the encrypted control word, decryptor 406 can decrypt the control word and send the decrypted control word to control word register 404. Control word register 404 can store the decrypted control word for decryptor 402. Upon receiving programming data from headend 102, the decryptor 402 can receive the control word from control word register 404. Decryptor 402 can then decrypt the programming data and send to transmitter 410. Additionally, because the usage rights data is encrypted using the control word, host processor 508 can send the usage rights data to decryptor 402 for decryption. Decryptor 402 can decrypt the usage rights data and return the decrypted usage rights data to host processor 508. Host processor 508 can then send the decrypted usage rights data to transmitter 410. Transmitter 410 can send the programming data, as well as the usage rights data to a device, such as display device 116.

One should note that while in some embodiments decryptor 402 is configured only to decrypt data, in other embodiments, this component may also be configured to encrypt data. In such an embodiment, component 402 may first receive a signal indicating whether to encrypt or decrypt subsequently received data. One should also note that while in this nonlimiting example, usage rights data is encrypted, this is not a requirement. More specifically, in at least one embodiment, encryptor 506 can be configured to simply provide authentication of the usage rights data with transport processor 202. Additionally, in at least one embodiment, recognizable patterns in the formatted usage rights data can be utilized such that tampering with the resulting encrypted version is likely to disrupt the patterns and thus be detectable.

Figure 6:
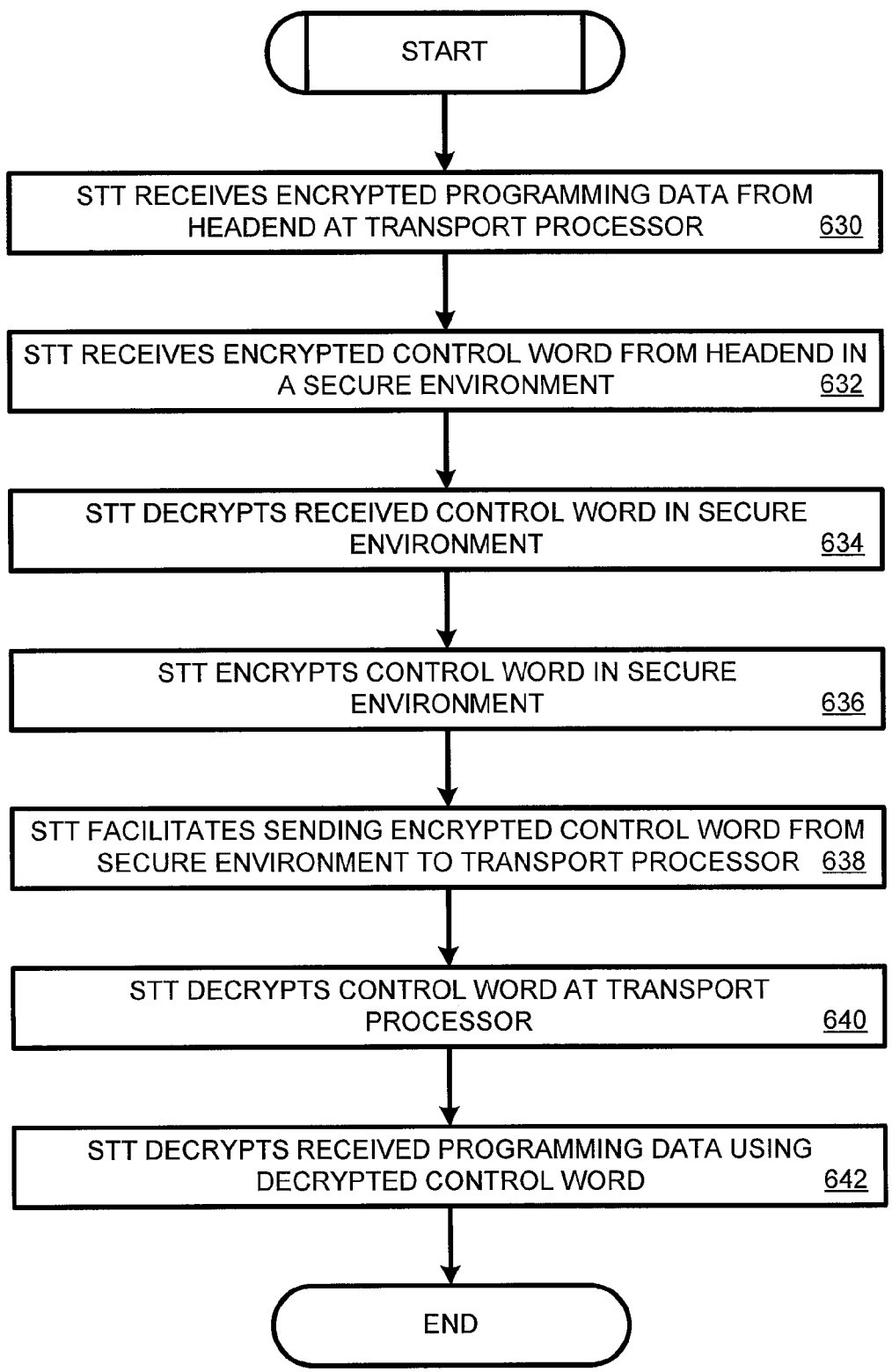
FIG. 6 is a flowchart illustrating an embodiment of a process that can be used to protect the integrity of a control word in an STT, such as the STT from FIG. 2.

FIG. 6 is a flowchart illustrating an embodiment of a process that can be used to protect the integrity of a control word in an STT, such as the STT from FIG. 2. More specifically, as illustrated in the nonlimiting example of FIG. 6, STT 114 can receive encrypted programming data from headend 102 at transport processor 202 (block 630). STT 114 can then receive an encrypted control word from headend 102 in a secure environment, such as secure processor 208 (block 632). STT 114 can then decrypt the received control word in the secure environment (block 634). The STT 114 can then encrypt the control word in the secure environment (block 636). The STT 114 can then facilitate sending the encrypted control word from the secure environment to transport processor 202 (block 638). STT 114 can then decrypt the control word at transport processor 202 (block 640). STT 114 can then decrypt the received programming data using the decrypted control word (block 642).

Figure 7:
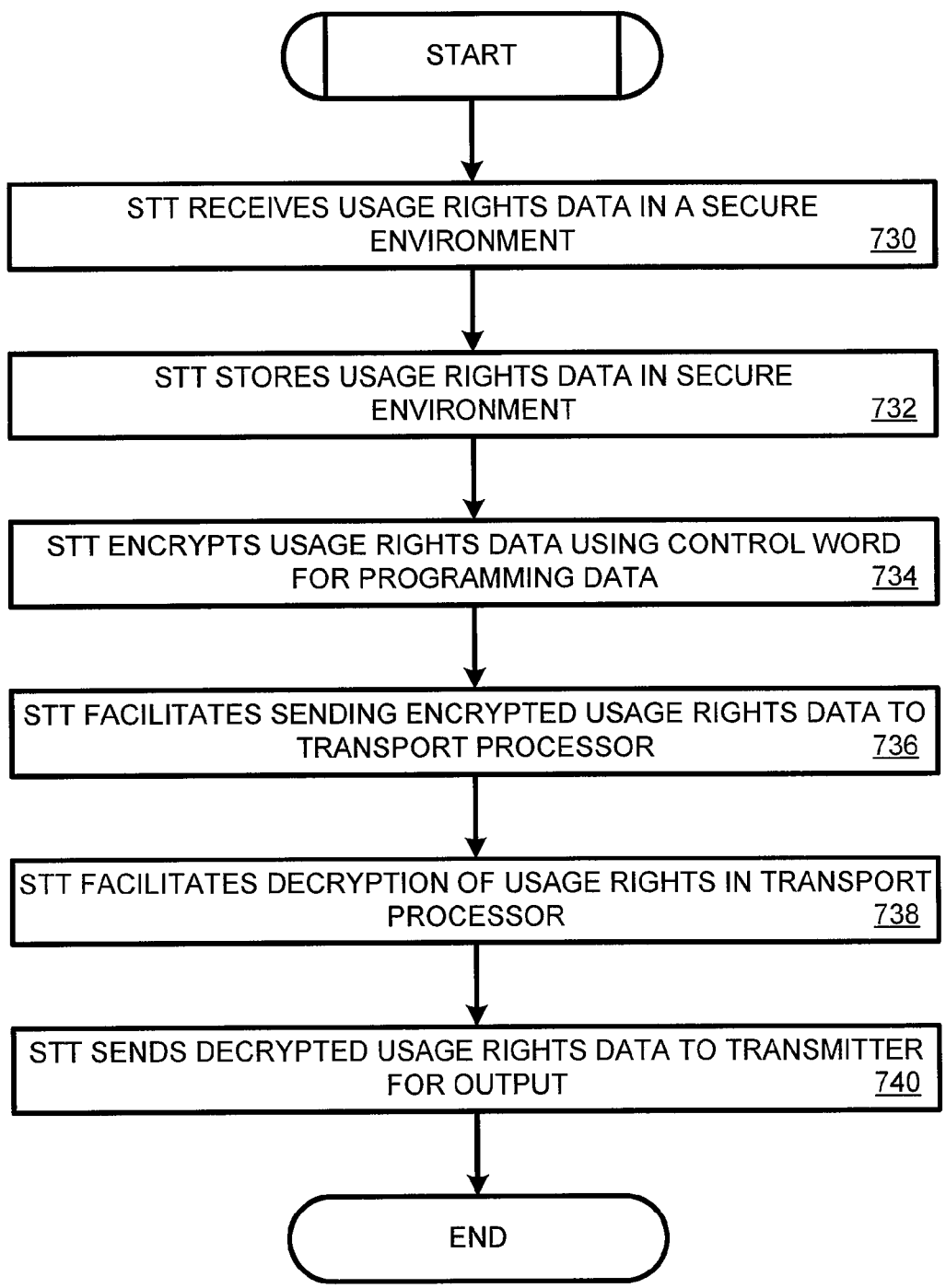
FIG. 7 is a flowchart illustrating an embodiment of a process that can be used to provide usage rights in an STT, similar to the flowchart from FIG. 6.

FIG. 7 is a flowchart illustrating an embodiment of a process that can be used to provide usage rights in an STT, similar to the flowchart from FIG. 6. More specifically, as illustrated in the nonlimiting example of FIG. 7, STT 114 can receive usage right data in a secure environment (block 730). STT 114 can then store the usage rights data in the secure environment (block 732). STT 114 can then encrypt the usage rights data using a control word that was used to encrypt programming data (block 734). STT 114 can facilitate sending of the encrypted usage rights data to a transport processor 202 (block 736). STT 114 can then facilitate decryption of usage rights in the transport processor (block 738). As the usage rights were encrypted using the control word that was used to encrypt the programming data, the control word can be used to decrypt the programming data and the usage rights data. As such, the secure environment and the transport processor 202 have a shared secret configured to prevent unauthorized manipulation of the programming data and/or the usage rights data. STT 114 can then send the decrypted usage rights data to a transmitter 410 for output (block 740).

Figure 8A:
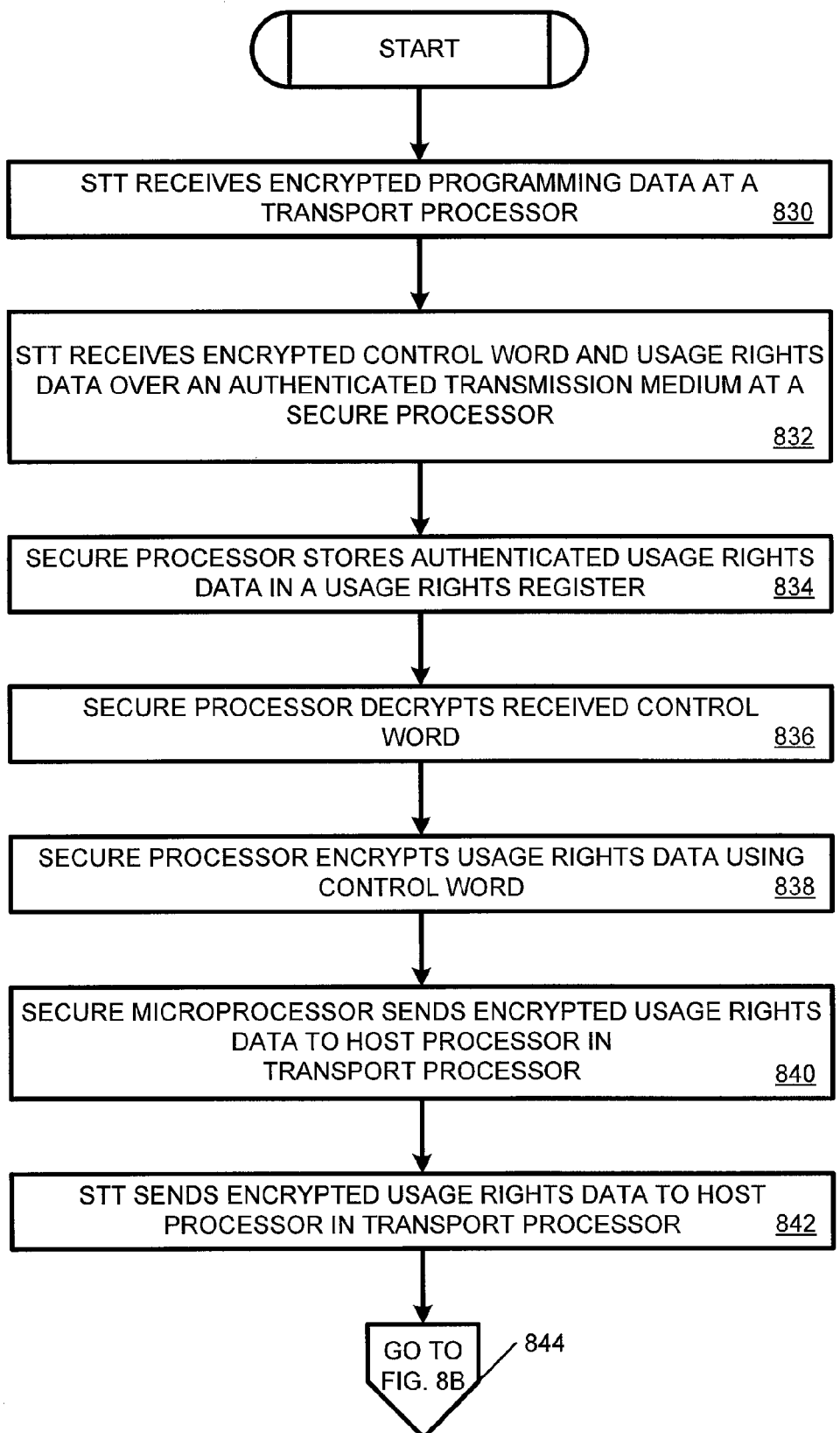
FIG. 8A is a flowchart illustrating an embodiment of a process that can be used to protect the integrity of a control word and usage rights in an STT, similar to the flowchart from FIG. 7.

FIG. 8A is a flowchart illustrating an embodiment of a process that can be used to protect the integrity of a control word and usage rights in an STT, similar to the flowchart from FIG. 7. As illustrated in this nonlimiting example, STT 114 can receive encrypted programming data at a transport processor 202 (block 830). STT 114 can receive an encrypted control word and authenticated usage rights data over an authenticated transmission medium at a secure processor 208 (block 832). Secure processor 208 can store the authenticated usage rights data in a usage rights register (block 834). Secure processor 208 can then decrypt the received control word (block 836). Secure processor can encrypt usage rights data using the control word (block 838). Secure processor 208 can then send the encrypted usage rights to host processor 508 in transport processor 202 (block 840). STT 114 can then facilitate communication of the encrypted usage rights data to host processor 508 in transport processor 202 (block 842). The flowchart can then proceed to jump block 844.

Figure 8B:
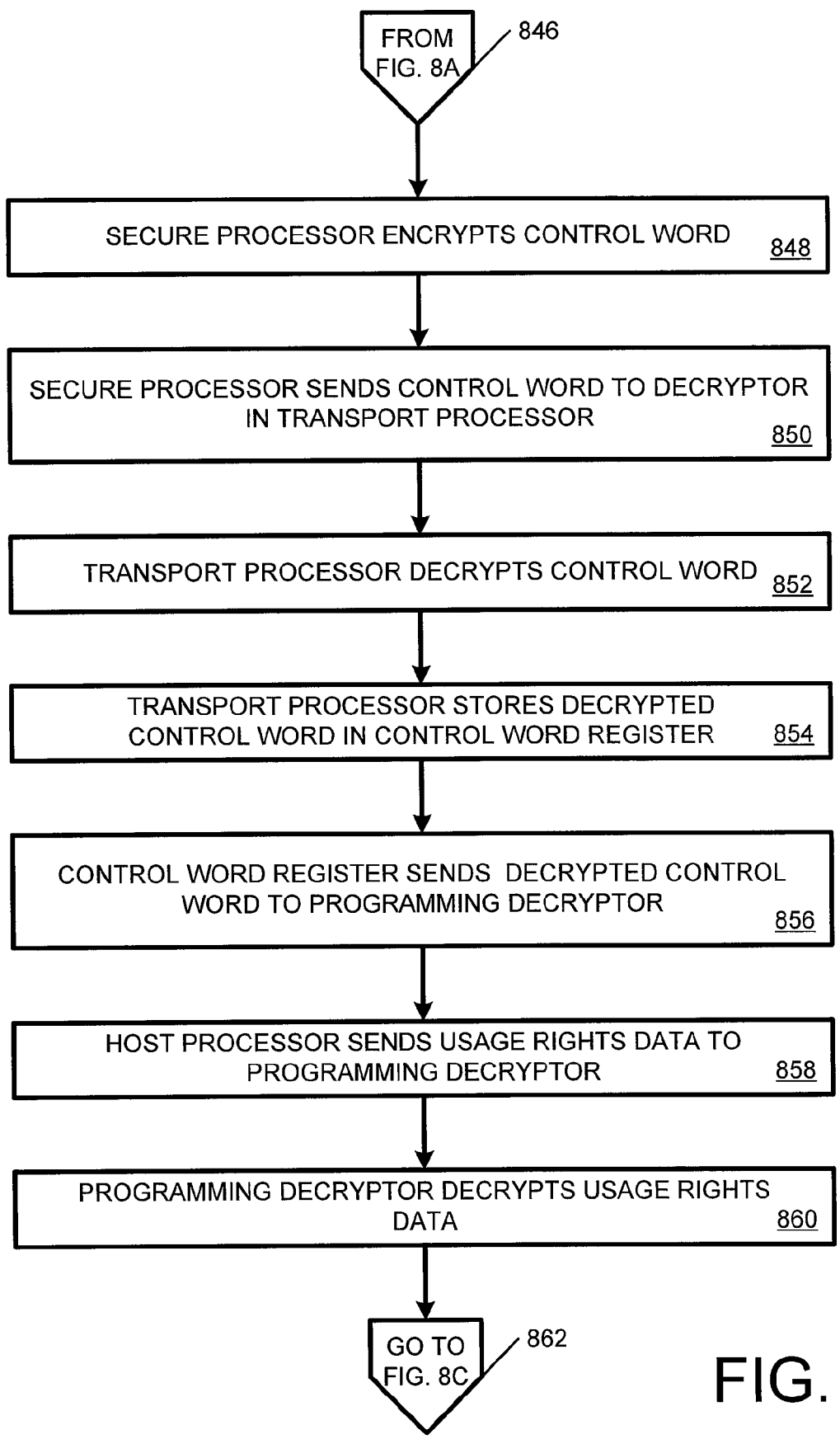
FIG. 8B is a continuation of the flowchart from FIG. 8A.

FIG. 8B is a continuation of the flowchart from FIG. 8A. More specifically, from jump block 846, secure processor 208 can encrypt the received control word (block 848). Secure processor 208 can then send the encrypted control word to decryptor 406 in transport processor 202 (block 850). Transport processor 202 can decrypt the received control word (block 852). Transport processor 202 can then store the decrypted control word in a control word register 404 (block 854). Control word register 404 can send the decrypted control word to a programming decryptor 402 (block 856). Host processor 508 can send the encrypted usage right data to programming decryptor 402 (block 858). Programming decryptor 402 can then decrypt the received usage rights data (block 860). The flowchart can then proceed to jump block 862.

Figure 8C:
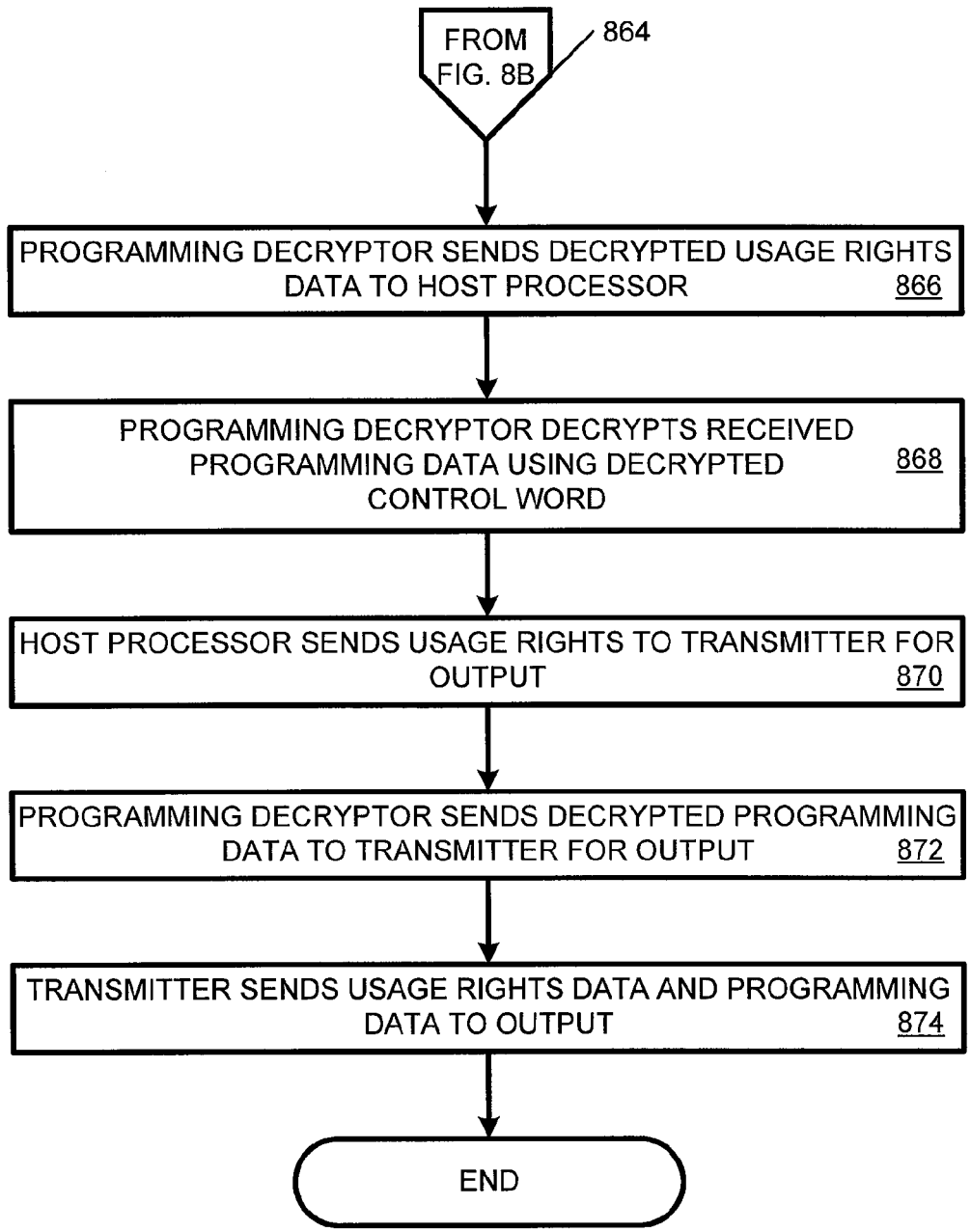
FIG. 8C is a continuation of the flowchart from FIG. 8B.

FIG. 8C is a continuation of the flowchart from FIG. 8B. From jump block 864, programming decryptor 402 can send the decrypted usage rights data to host processor 508 (block 866). Programming decryptor 402 can decrypt the received programming data using the decrypted control word (block 868). Host processor 508 sends usage rights to transmitter 410 for output (block 870). Programming decryptor 402 sends decrypted programming data to transmitter 410 for output (block 872). Transmitter 410 sends usage rights data and programming data to output (block 874).

One should note that the flowcharts included herein show the architecture, functionality, and operation of a possible implementation of software and/or hardware. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A system for data authentication, comprising:
    a secure processor comprising a physically secure environment wherein, subsequent to manufacture of the secure processor, operations and calculations made within the secure environment are unobservable by other components outside of the secure processor, the secure processor configured to;
        receive an encrypted control word from a headend via a first Entitlement Control Message (ECM),
        decrypt the encrypted control word using a second decryption key to render the control word,
        encrypt the control word using a first encryption key,
        receive usage rights data from the headend via a second ECM, encrypt the received usage rights data using the control word, and send the received usage rights data; and a transport processor configured to:

receive the encrypted control word that was encrypted using the first encryption key from the secure processor, decrypt the received control word using a first decryption key, wherein the first decryption key is compatible with the first encryption key, receive the encrypted usage rights data from the secure processor, decrypt the received usage rights data using the control word, and send the decrypted usage rights data to a display device.

2. The system of claim 1, wherein the transport processor is further configured to receive encrypted programming data from the headend, wherein the transport processor is further configured to decrypt the encrypted programming data using the decrypted control word.

3. The system of claim 2, wherein the transport processor is further configured to send the decrypted programming data to the display device.

4. The system of claim 1, wherein the secure processor is further configured to create at least one pattern in the usage rights data.

5. The system of claim 1, wherein the transport processor and the transport processor are contained in one set top terminal.

6. A method for data authentication, the method comprising:

receiving, at a secure processor, an encrypted control word from a headend via a first Entitlement Control Message (ECM), wherein the secure processor comprises a physically secure environment wherein, subsequent to manufacture of the secure processor, operations and calculations made within the secure environment are unobservable by other components outside of the secure processor;

decrypting, at the secure processor, the encrypted control word using a second decryption key to render the control word;

encrypting, at the secure processor, the control word using a first encryption key;

receiving, at the secure processor, usage rights data from the headend via a second ECM;

encrypting, at the secure processor, the received usage rights data using the control word;

sending, from the secure processor, the received usage rights data;

receiving, at a transport processor, the encrypted control word that was encrypted using the first encryption key from the secure processor;

decrypting, at the transport processor, the received control word using a first decryption key, wherein the first decryption key is compatible with the first encryption key;

receiving, at the transport processor, the encrypted usage rights data from the secure processor;

decrypting, at the transport processor, the received usage rights data using the control word; and sending, from the transport processor, the decrypted usage rights data to a display device.

7. The method of claim 6, further comprising:

receiving, at the transport processor, encrypted programming data from the headend; and decrypting, at the transport processor, the encrypted programming data using the decrypted control word.

8. The method of claim 7, further comprising sending, from the transport processor, the decrypted programming data to the display device.

9. The method of claim 6, further comprising creating, at the secure processor, at least one pattern in the usage rights data.

10. The method of claim 6, wherein the transport processor and the transport processor are contained in one set top terminal.

11. Computer-readable storage media that store sets of instructions which when executed on respective processors perform a method for providing data authentication, the method executed by the sets of instructions comprising:

receiving, at a secure processor, an encrypted control word from a headend via a first Entitlement Control Message (ECM), wherein the secure processor comprises a physically secure environment wherein, subsequent to manufacture of the secure processor, operations and calculations made within the secure environment are unobservable by other components outside of the secure processor;

decrypting, at the secure processor, the encrypted control word using a second decryption key to render the control word;

encrypting, at the secure processor, the control word using a first encryption key;

receiving, at the secure processor, usage rights data from the headend via a second ECM;

encrypting, at the secure processor, the received usage rights data using the control word;

sending, from the secure processor, the received usage rights data;

receiving, at a transport processor, the encrypted control word that was encrypted using the first encryption key from the secure processor;

decrypting, at the transport processor, the received control word using a first decryption key, wherein the first decryption key is compatible with the first encryption key;

receiving, at the transport processor, the encrypted usage rights data from the secure processor;

decrypting, at the transport processor, the received usage rights data using the control word; and sending, from the transport processor, the decrypted usage rights data to a display device.

12. The computer-readable storage media of claim 11, further comprising:

receiving, at the transport processor, encrypted programming data from the headend; and decrypting, at the transport processor, the encrypted programming data using the decrypted control word.

13. The computer-readable storage media of claim 12, further comprising sending, from the transport processor, the decrypted programming data to the display device.

14. The computer-readable storage media of claim 11, further comprising creating, at the secure processor, at least one pattern in the usage rights data.

15. The computer-readable storage media of claim 11, wherein the transport processor and the transport processor are contained in one set top terminal.

* * * * *